(No Model.)
F. WOLF.
PLOWSHARE.
No. 602,711. Patented Apr. 19, 1898.
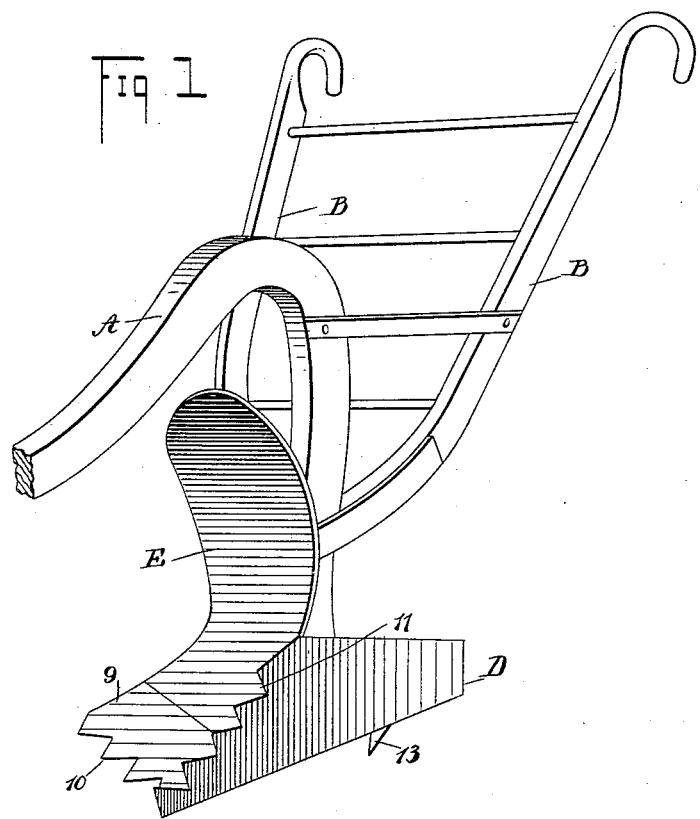
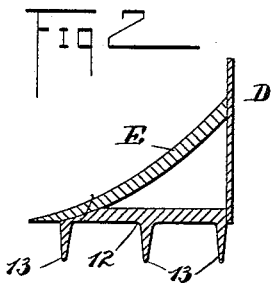
WITNESSES:
INVENTOR
F. Wolf.
BY
ATTORNEYS.
THE NORRIS PETERS CO., PHOTO-LITHO., WASHINGTON, D. C.

UNITED STATES PATENT OFFICE.

FREDERICK WOLF, OF QUINCY, ILLINOIS.

PLOWSHARE.

SPECIFICATION forming part of Letters Patent No. 602,711, dated April 19, 1898.

Application filed July 7, 1897. Serial No. 643,694. (No model.)

*To all whom it may concern:*

Be it known that I, FREDERICK WOLF, of Quincy, in the county of Adams and State of Illinois, have invented a new and useful Improvement in Plowshares, of which the following is a full, clear, and exact description.

The object of my invention is to provide a plowshare which, in addition to turning up and turning over the soil, will also penetrate the upset portion of the soil to such an extent as to pulverize the same, rendering a field over which the plow has been drawn freer from large clods than when an ordinary plowshare has been employed, and enabling the services of a harrow to be dispensed with in many cases, and when a harrow is used not entailing thereon the usual amount of work.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of a plow embodying my invention and viewed from the front; and Fig. 2 is a section through the moldboard and landside, showing cutters extended below the plane of the share.

Referring to the drawings, A designates a plow-beam, and B the handles. Supported by the beam is the moldboard E, to the lower forward end of which a share 9 is attached. This share 9 is provided with a series of forwardly-projected teeth 10, here shown as substantially in the shape of saw-teeth. These teeth, when drawn through the ground, will tend to pulverize the earth to be taken up and turned over by the moldboard.

The landside D is provided at its front end with a series of stepped teeth or blades 11, which are angular and project forward of the upper or landside edge of the moldboard. These teeth 11 will cut the ground somewhat similar to a colter; but as there are several teeth or blades they will assist the teeth 10 in pulverizing the earth and will be of great utility, especially when the soil is heavy or damp.

In order that the earth at the bottom of the furrow made by the share shall be penetrated and loosened, I may secure a bar 12 at the rear of the moldboard, said bar being provided with teeth or points 13 of sufficient length to penetrate the earth and loosen the same below the plane reached by the teeth on the share.

Having thus described my invention, I claim as new and desire to secure by Letters Patent—

1. A plow, having a series of forwardly-extending teeth at the front end thereof, and a series of teeth or blades arranged on the plow at a point along and extending forward beyond the upper edge or landside edge of the moldboard, substantially as specified.

2. A plow, comprising a moldboard, and a series of teeth or blades arranged on the plow at a point along and extending forward beyond the upper or landside edge of the moldboard, substantially as specified.

3. In a plow, a moldboard, a share on said moldboard, the said share having forwardly-extending teeth, a bar at the rear of the moldboard, and teeth on said bar extending downwardly below the plane of the first-named teeth, substantially as specified.

4. In a plow, a moldboard, a share on the moldboard and provided with forwardly-projecting teeth, a landside having teeth or blades on its upper edge which extend forward of the moldboard, and a series of teeth rearward of and extended to cut the ground below the plane of the first-named teeth, substantially as specified.

FREDERICK WOLF.

Witnesses:
   B. AWERKAMP,
   OSCAR P. HUNT.